United States Patent Office 3,547,576
Patented Dec. 15, 1970

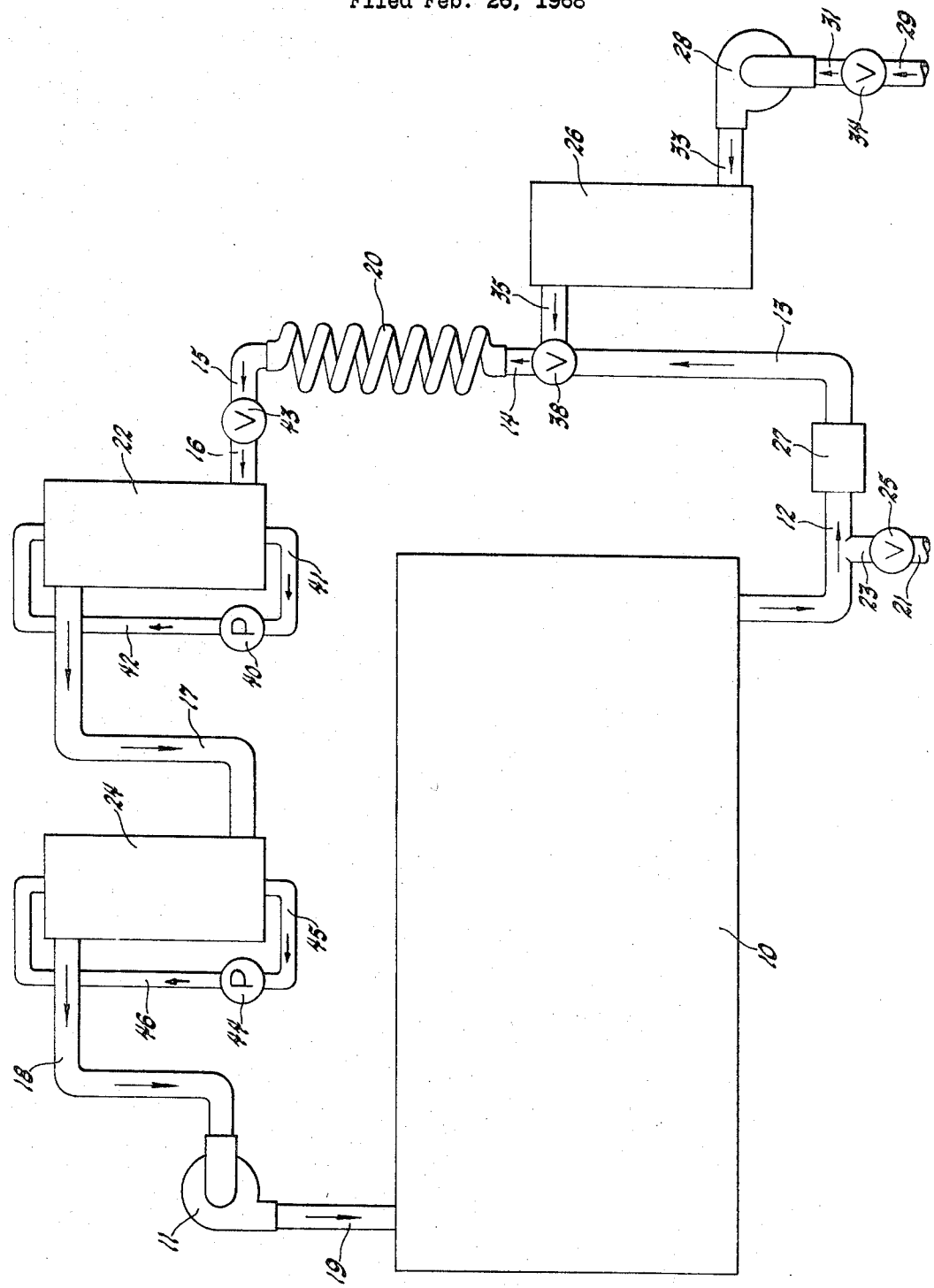

3,547,576
AIR STERILIZATION PROCESS
Morris I. Sheikh, 803 Canterbury Crescent,
Bloomfield Hills, Mich. 48013
Filed Feb. 26, 1968, Ser. No. 708,183
Int. Cl. A61l 9/02, 9/04; F24f 3/16
U.S. Cl. 21—53                                  8 Claims

ABSTRACT OF THE DISCLOSURE

An air sterilization process for killing bacterial organisms in air comprising exposing iodine crystals to a current of air whereby iodine is volatilized and incorporated into such air, mixing such iodine laden air with air to be sterilized so as to kill the bacterial organisms therein, and thereafter washing said air mixture with an iodine holding liquid which captures the iodine in said air mixture and holds it in liquid form against evaporation so as to remove the iodine therefrom, whereby to produce sterilized air free of bacterial organisms and of iodine.

---

My invention relates to a process for sterilizing air by which the same is rendered free of bacterial organisms. Said process has innumerable commercial applications such as sterilizing the air of one or more rooms of a building, e.g. an operating room or an intensive care ward of a hospital, or sterilizing the air of an entire building such as a hospital or a food processing plant. My air sterilization process is particularly useful in installations where rancidity odors are generated such as tanneries and glue factories as the complete elimination of such odors is a concomitant effect of sterilizing air by my process.

My invention may be more readily understood by reference to the accompanying drawing which depicts in schematic form an air sterilization process embodying my invention and shown functioning externally of air enclosing means 10, the air of which is to be sterilized. The air enclosing means 10 may be a building or one or more rooms thereof. Preferably the air in the air enclosing means 10 is kept under positive pressure by means and method well known in the air conditioning industry. 11 designates a prime mover of air, such as an air blower of such capacity as to be capable of circulating the air of the enclosing means 10 through an external air circuit comprising a bacterial organism kill chamber 20, washing towers 22 and 24 and air lines 12–19 and of changing the air of the air enclosing means 10 in a predetermined minimum period of time as required by the air make-up standard for the particular application. The air of the air enclosing means 10 to be sterilized in being circulated through said external air circuit is fed through solids separating means 27 of well known construction in the art to which my invention pertains by which dust and other solids are removed from the air of the air enclosing means 10. Fresh make-up air as needed is introduced into said air circuit prior to said solids separating means 26 via inlet air lines 21 and 23 and a flow control valve 25 therefor. I provide an iodine generator not unlike that shown in my prior U.S. Pat. 3,244,630 which includes a container 26 filled with iodine crystals. Air is introduced into the bottom of the container 26 via inlet air lines 29, 31 and 33 and leaves the top of the container 26 via output air line 35. 34 designates a flow control valve in the inlet air lines 29 and 31. Such air flows upwardly through the iodine crystals in the container 26 causing iodine to sublime thus charging the air in the output air line 35 with iodine in gaseous form. I provide means such as a variable output blower 28 to control the amount of air which flows upwardly in the container 26 to vary the amount of sublimed iodine in the air entering output air line 35. I have found that I can use ambient air for feeding the inlet air line 29 to sublime the iodine in the container 26 although such air may be warmed as taught in my said prior U.S. patent. The iodine charged air exiting from the output air line 35 is mixed via a mixing valve 38 with the air to be sterilized in the air line 13 and such mixture is fed via an air line 14 to the bacterial organism kill chamber 20. The latter is constructed as is well known in the art to which my invention pertains to further mix and retain the components of said iodine laden air mixture in intimate admixture sufficient to kill the bacterial organisms in the air to be sterilized. Minute amounts of iodine in the iodine charged air exiting from the output air line 35, e.g. ½ grain of iodine per one thousand cubic foot of air, will kill all of the bacterial organisms in the air to be sterilized instantaneously upon contact therewith. Such bacterial organisms so killed in the chamber 20 include the full spectrum of living micro-organisms including, in addition to bacteria, germs, viruses, fungi, molds and the like. The term bacterial organisms is used herein in such inclusive sense as in the case of my said prior U.S. patent. The sterilized air mixture leaving the chamber 20 is fed via air lines 15 and 16 to the base of a first washing tower 22 in which it rises while being scrubbed with an iodine holding liquid percolating downwardly in the tower 22 from the top thereof. Such liquid captures the iodine in said air mixture and holds it in liquid form against evaporation. 43 designates a flow control valve in the air lines 15 and 16. The iodine holding liquid reaching the bottom of the tower 22 is pumped to the top thereof by a pump 40 and liquid lines 41 and 42. The air mixture leaving the top of the washing tower 22 is fed via air line 17 to the bottom of a second washing tower 24 in which it rises while being scrubbed with another iodine holding liquid percolating downwardly in the tower 24 from the top thereof. Such other iodine holding liquid reaching the bottom of the tower 24 is pumped to the top thereof by a pump 44 and liquid lines 45 and 46. The sterilized air mixture leaving the top of the washing tower 24 is free of bacterial organisms and of iodine and is returned to the air enclosing means 10 via air lines 18 and 19. All of the air of the air enclosing means 10 can be thus sterilized in the above-mentioned minimum time period. The air of the air enclosing means 10 can be circulated through said external air circuit continuously or intermittently. The iodine generator can be operated continuously or intermittently.

The iodine holding liquid utilized in the first washing tower 22 is a liquid organic compound which is capable of complexing the iodine in said air mixture and holding it in biocidally active form. This is very important as capturing the iodine in this form from the air mixture passing through the first washing tower 22 produces an iodine complexed organic liquid which is capable of effecting a secondary sterilization function in respect to said air mixture and which is an extremely useful byproduct of my process. Complexing per se of iodine by organic compounds is well known. It is believed that an electron transfer occurs between the organic compound and the iodine to form what is sometimes referred to as a charge transfer complex in which the iodine and the organic compound are oppositely charged. See J. Am. Chem. Soc. 72, 600–608 (1950); Chem. Rev. 58, 1113–1156 (1958); Quart. Rev. 15, 191–206 (1961) and the references cited therein. The liquid organic compound which I can use in my process for washing the air mixture passing through the first washing tower 22 is an aromatic compound having a flash point of at least 200 degrees Fahrenheit (Cleveland open cup). Examples of such a liquid organic compound which I prefer to use for this purpose are surface active compounds in concentrate form, such as nonionic alkyl phenol ethylene oxide condensate surface active compounds; nonionic polyoxypropylene glycol ethylene oxide condensate surface active compounds; anionic alkyl phenyl and alkyl naphthyl sulfonate surface active compounds; and cationic quaternary ammonium surface active compounds. The iodine complexed surface active compound produced as a byproduct from washing the air mixture passing through the first washing tower 22 has manifold industrial uses as a detergent-iodine concentrate.

The following define the liquid I prefer to use for washing the air mixture passing through the first washing tower 22.

(a) Nonionic surface active agents having the formula: $R(CHR^1CHR^1O)_nH$ wherein R equals the residue of a water insoluble organic compound containing at least 6 carbon atoms and having an active hydrogen, $R^1$ equals hydrogen or a lower alkyl, and $n$ is an integer between 3 and 400. Particularly a polyglycol ether of an alkyl phenol having the formula:

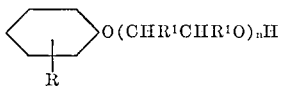

wherein R equals 1 or more alkyl groups containing a total of 6 to 24 carbon atoms, $R^1$ equals hydrogen or a lower alkyl and $n$ is an integer between 1 and 400. Specifically nonylphenol ethylene oxide condensate containing 1 to 40 mols of ethylene oxide per mol of phenol. For example, nonyl phenol ethylene oxide condensate containing 4 to 40 mols of ethylene oxide per mol of phenol.

(b) Nonionic surface active agents having the formula:

$$HO(C_2H_4O)_x(C_3H_6O)_y(C_2H_4O)_{x'}H$$

wherein $y$ equals at least 15 and $(C_2H_4O)x+x'$ equals 20 to 90 percent of the total weight of said compound. For example, polyoxypropylene glycol ethylene oxide condensate, the polyoxypropylene glycol group of which has a molecular weight of 1501 to 1800 and containing from 40 to 50 percent by weight of ethylene oxide.

(c) Anionic surface active compounds which include alkyl aryl sulfonates, the alkyl group of which contains 3 to 30 carbon atoms and the aryl group of which is phenyl or naphthyl. For example, $C_{12}$ to $C_{18}$ alkyl benzene triethanolamine sulfonate.

(d) Cationic surface active compounds of the formula:

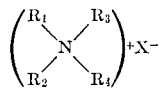

wherein at least one of the radicals $R_1$, $R_2$, $R_3$ and $R_4$ attached to the nitrogen atom is a hydrophobic aliphatic or araliphatic radical of from 6 to 26 carbon atoms. The remaining radicals on the nitrogen atom other than the hydrophobic aliphatic or araliphatic radicals are substituents of hydrocarbon structure containing a total of no more than 12 carbon atoms. The radical X in the above formula may be any salt-forming anionic radical. For example, dodecylbenzyl dimethyl ammonium chloride. Said aliphatic or araliphatic radicals may be long chain alkyl, alkoxyaryl, alkylaryl, alkylphenoxyalkyl, arylalkyl and the like.

The iodine holding liquid utilized in the second washing tower 24 is a liquid inorganic compound which is capable of reacting with iodine to form a soluble iodide and of dissolving any of the aforementioned organic liquid which may be contained in the air mixture leaving the first washing tower 22 either by evaporation or entrainment or both. The liquid inorganic compound which I can use in my process for washing the air mixture passing through the second washing tower 24 is an aqueous alkaline solution of ammonium, alkaline earth or alkali metal salts or hydroxides. Examples of such a liquid inorganic compound which I prefer to use are the alkali metal hydroxides. I prefer that said liquid inorganic compound include an inorganic reducing compound capable of reacting with iodine via an oxidation-reduction reaction to form a soluble iodide. Examples of such inorganic reducing compounds are the alkali metal sulfites or thiosulfates.

Means were constructed in accordance with the accompanying drawing to carry out my described process internally of an air enclosing means 10. Said means in the form of an essentially portable air sterilization machine was placed within a laboratory room. A screen was placed over the inlet to said machine equivalent to the inlet air line 12 to cover the same. Another screen was similarly placed over the outlet of said machine equivalent to the outlet air line 19 beyond the prime mover 11. This outlet of the machine exhausted the air mixture leaving the second washing tower 24 into the laboratory room. In the air line 18 ahead of the prime mover 11 provision was made to place bacterial organism culture plates. Similar provision was made in the air line 12 beyond the inlet screen mentioned but ahead of the bacterial organism kill chamber 14. The following examples illustrate the efficacy of my process in producing sterilized air free of bacterial organisms. In each test nonyl phenol-ethylene oxide condensate containing 10 mols of ethylene oxide per mol of phenol was used as the iodine holding liquid in the first washing tower 22 and a 10 percent aqueous solution of equal parts of sodium hydroxide and sodium thiosulfate was used as the iodine holding liquid in the second washing tower 24. In each test the sterilized air mixture exiting from the outlet air line 18 was found to contain no trace of iodine.

EXAMPLE I

Said process was carried out via said machine, the source of air of which entering the inlet air line 12 was the room air of said laboratory. 200, 500 and 1500 cubic feet of such air were passed through said machine from the inlet air line 12 to the outlet air line 19 in three different tests. In each such test no bacterial organisms were cultured on the outlet culture plates while in each such test 4 colonies of bacterial organisms were cultured on the inlet culture plates.

EXAMPLE II

The tests of Example I were repeated except that the room air of said laboratory entering the inlet air line 12 was contaminated with dust containing bacterial organisms. The dust was rubbed for 30 seconds over the screen covering the inlet air line 12 and 46 colonies of bacteria were cultured on an inlet culture plate. In three different tests in which such dust was rubbed for 30 seconds over said inlet screen 100, 500 and 1000 cubic feet of laboratory room air containing said contaminating dust was passed through said means. In each such test no bacterial organisms were cultured on the outlet culture plates.

EXAMPLE III

The tests of Example I were repeated except that the room air of said laboratory entering the inlet air line 12 was contaminated with a liquid containing bacterial organisms to the extent that plate counts of 300,000 bacterial organisms per milliliter of said liquid were obtained. In four different tests in which the liquid was atomized in front of said inlet screen for the duration of each test, 1000, 1000, 1000 and 1500 cubic feet of laboratory air containing said contaminating liquid was passed through said means. In each such test no bacterial organisms were cultured on the outlet culture plates.

My process has been found to be completely effective in removing sulphides, mercaptans, proteins, animal tissue and the like contaminating substances which generate rancidity odors.

It will thus be seen that there has been provided by my invention an air sterilization process in which many thoroughly practical advantages have been successfully achieved. While a preferred embodiment of the invention has been shown and described it is to be understood that variations and changes may be resorted to without departing from the spirit of the invention as defined by the appended claims.

I claim:

1. Air sterilization process for killing bacterial organisms in air comprising exposing iodine crystals to a current of air whereby iodine is volatilized and incorporated into such air, mixing such iodine laden air with air to be sterilized so as to kill the bacterial organisms therein, and thereafter washing said air mixture with an iodine holding liquid which captures the iodine in said air mixture and holds it in liquid form against evaporation so as to remove the iodine therefrom, said iodine holding liquid complexing the iodine and holding it in biocidally active form, whereby to produce sterilized air free of bacterial organisms and of iodine.

2. Air sterilization process for killing bacterial organisms in air comprising exposing iodine crystals to a current of air whereby iodine is volatilized and incorporated into such air, mixing such iodine laden air with air to be sterilized so as to kill the bacterial organisms therein, and thereafter washing said air mixture with an iodine holding liquid which captures the iodine in said air mixture and holds it in liquid form against evaporation so as to remove the iodine therefrom, said washing of said air mixture being accomplished in two stages, the first of which employs a liquid organic compound which complexes the iodine in said air mixture and holds it in biocidally active form, whereby to produce sterilized air free of bacterial organisms and of iodine.

3. Air sterilization process as claimed in claim 2 wherein said liquid organic compound is an aromatic compound having a flash point of at least 200 degrees Fahrenheit.

4. Air sterilization process as claimed in claim 3 wherein said liquid organic compound is a surface active compound in concentrate form.

5. Air sterilization process as claimed in claim 2 wherein the second stage employs a liquid inorganic compound which reduces to a soluble iodide any iodine which may be contained in said air mixture leaving the first stage and which dissolves any of said organic compound which may be contained in said air mixture leaving the first stage.

6. Air sterilization process as claimed in claim 5 wherein said liquid inorganic compound includes an inorganic reducing agent.

7. Air sterilization process for killing bacterial organisms in air comprising exposing iodine crystals to a current of air whereby iodine is volatilized and incorporated into such air, mixing such iodine laden air with air to be sterilized so as to kill the bacterial organisms therein and thereafter washing said air mixture with a liquid organic surface active compound which complexes the iodine in said air mixture and holds it in liquid form against evaporation and in biocidally active form.

8. Air sterilization process as claimed in claim 7 further comprising thereafter washing said air mixture with a liquid inorganic compound selected from the group consisting of ammonium, alkaline earth and alkali metal salts and hydroxides, said liquid inorganic compound containing an inorganic reducing compound.

References Cited

UNITED STATES PATENTS

| | | | |
|---|---|---|---|
| 2,373,111 | 4/1945 | Franco | 23—4X |
| 3,039,916 | 6/1962 | Neracher et al. | 424—150X |
| 3,084,024 | 4/1963 | Hamilton et al. | 23—4 |
| 3,230,033 | 1/1966 | Hamilton et al. | 21—74 |
| 3,244,630 | 4/1966 | Sheitch | 252—49.5 |
| 3,277,010 | 10/1966 | Schenck et al. | 424—150X |
| 3,326,806 | 6/1967 | Dolby | 424—150X |
| 3,352,628 | 11/1967 | Starbuck | 21—53X |
| 3,355,386 | 11/1967 | Cantor et al. | 424—150X |

FOREIGN PATENTS

| | | | |
|---|---|---|---|
| 373,207 | 5/1932 | Great Britain | 21—58 |

MORRIS O. WOLK, Primary Examiner

B. S. RICHMAN, Assistant Examiner

U.S. Cl. X.R.

21—58; 23—4; 55—71; 62—78; 424—150